(12) United States Patent
Balog et al.

(10) Patent No.: US 9,246,757 B2
(45) Date of Patent: Jan. 26, 2016

(54) COMMISSIONING DEVICES FOR AUTOMATION SYSTEMS

(71) Applicant: Zonoff, Inc., Malvern, PA (US)

(72) Inventors: Michael Balog, Philadelphia, PA (US); Michael Harris, Phoenixville, PA (US); Ryan Buchert, Phoenixville, PA (US)

(73) Assignee: Zonoff, Inc., Malvern, PA (US)

( * ) Notice: Subject to any disclaimer, the term of this patent is extended or adjusted under 35 U.S.C. 154(b) by 43 days.

(21) Appl. No.: 13/748,350

(22) Filed: Jan. 23, 2013

(65) Prior Publication Data

US 2013/0191755 A1  Jul. 25, 2013

Related U.S. Application Data

(60) Provisional application No. 61/632,337, filed on Jan. 23, 2012, provisional application No. 61/632,338, filed on Jan. 23, 2012.

(51) Int. Cl.
*G06F 3/0481* (2013.01)
*H04L 12/24* (2006.01)
*H04L 12/28* (2006.01)

(52) U.S. Cl.
CPC ........ *H04L 41/0806* (2013.01); *H04L 12/2807* (2013.01)

(58) Field of Classification Search
CPC combination set(s) only.
See application file for complete search history.

(56) References Cited

U.S. PATENT DOCUMENTS

| | | | |
|---|---|---|---|
| 6,948,136 B2 * | 9/2005 | Trewin | 715/865 |
| 7,016,888 B2 * | 3/2006 | Slemmer et al. | 706/47 |
| 7,593,874 B1 * | 9/2009 | Yoshizawa | G06Q 10/10 705/30 |
| 8,103,763 B2 * | 1/2012 | Slepov | H04L 12/2602 709/220 |
| 8,452,868 B2 * | 5/2013 | Shafer | G08B 13/2402 340/568.1 |
| 8,478,871 B2 * | 7/2013 | Gutt | H04L 41/00 709/222 |
| 2004/0098167 A1 * | 5/2004 | Yi | G06N 3/008 700/245 |
| 2005/0064916 A1 * | 3/2005 | Ozluturk et al. | 455/575.1 |
| 2005/0176408 A1 * | 8/2005 | Stein | 455/411 |
| 2010/0049841 A1 * | 2/2010 | Wang | 709/222 |
| 2010/0083356 A1 * | 4/2010 | Steckley | H04L 12/2818 726/5 |
| 2010/0180019 A1 * | 7/2010 | Elston et al. | 709/222 |
| 2010/0205301 A1 * | 8/2010 | Ansari | G06Q 30/04 709/225 |
| 2010/0214948 A1 * | 8/2010 | Knibbe et al. | 370/254 |
| 2010/0277300 A1 * | 11/2010 | Cohn et al. | 340/506 |
| 2010/0280635 A1 * | 11/2010 | Cohn et al. | 700/90 |

OTHER PUBLICATIONS

"StratIS", Case Study: Wynn Hotel & Casino, Bulogics, as retrieved from http://stratisems.c

* cited by examiner om/?page_id=25 on May 28, 2013, pp. 1-3.

*Primary Examiner* — Phenuel Salomon
(74) *Attorney, Agent, or Firm* — Mendelsohn Dunleavy, P.C.; Steve Mendelsohn (57) ABSTRACT

Remote commissioning for an automation system enables a retailer to sell a new device to a customer pre-configured to work together with devices that are already a part of the user's automation system. Knowledge of how the devices are likely to be used at the automation system's location, a list of existing devices already installed and how they are configured, possible input from the customer, and the end user's current usage patterns are optionally used to configure the devices before they leave the store. Assisted local commissioning for an automation device enables an end user to commission devices themselves by simplifying the installation and commissioning process. The system uses a reference database of devices that includes information on how to commission the devices along with user-manual information and pictures for physical installation, and setup instructions so the system can walk a user through the process step by step.

12 Claims, 10 Drawing Sheets

COMMISSIONING DEVICES FOR AUTOMATION SYSTEMS

CROSS-REFERENCE TO RELATED APPLICATIONS

This application claims the benefit of the filing date of U.S. provisional application Nos. 61/632,337 and 61/632,338, both of which were filed on Jan. 23, 2012, the teachings of both of which are incorporated herein by reference in their entirety.

BACKGROUND

1. Field of the Invention

The present invention relates to automation systems. More particularly but not exclusively, the invention relates to techniques for commissioning devices for automation systems for homes, businesses, campuses, buildings, and the like.

2. Description of the Related Art

This section introduces concepts that may help facilitate a better understanding of the invention. Accordingly, the statements of this section are to be read in that light and are not to be understood as admissions about what is prior art or what is not prior art. In the following, the term "home automation" may be used in descriptions of the prior art and embodiments of the invention. While home automation has a specific meaning in the prior art, it should be interpreted in this specification as applicable to not just personal residences but also dwellings of all types including homes, factories, businesses, and business and/or educational campuses. Further, it is applicable to regions or logical groupings of dwellings within a region (e.g., a micro-grid associated with a particular utility company). Finally, the term "automation" should be understood to include operations such as security management, facilities management, and energy management.

Conventional home automation systems are generally constructed using separately purchased, independent components that are commissioned to work together for the needs of a particular installation. In some cases, these components are not even designed to work together, and glue logic is required to commission them into an interoperable system. Because of the wide variety of setup possibilities, the interfaces for the commissioning process are so complex that a trained installer or a sophisticated end-user are generally the only ones able to perform these installations.

The process of commissioning can involve many steps such as "mating" the devices so they are aware of each-other, setting up "scenes" defining states of the devices working together, and creating "events" or "timers" to create actual automation. In many cases, a variety of radio-frequency (RF) networks may be involved, each with different connection requirements and configuration complexities. End-users do not normally know what is involved in getting these devices and systems to work with each other and instead rely on trained installers to figure out what they want and to create it for them.

Examples of networks involved in home automation, security and energy-management systems include Zigbee, Zwave, Bluetooth, near-field communications (NFC), and WiFi. An overview of some of these networks and their use can be found in "After 11n: The future of Wireless Home Networking," PC magazine article, Feb. 5, 2009, retrieved from http://www.pcmag.com/article2/0,2817,2340429,00.asp incorporated herein by reference in its entirety. Information on Zigbee, Zwave, Bluetooth, NFC, and Wifi can be found in "ZigBee Specification" Document 053474r19 (http://www.zigbee.org/Specifications/ZigBee/Overview.aspx), "Z-Wave Protocol Overview" Document No.: SDS10243 (http://www.z-wavealliance.org/about-z-wave), https://bluetooth.org/About/bluetooth_sig.htm, http://www.nearfield-communication.org/, and http://wi-fi.org/, the contents of which are incorporated herein by reference in their entirety. Further examples include IEEE 802.15.4, SmartLab's Insteon dual-mesh technology, EnOcean low power or battery-less wireless technology, and 6LoWPAN IPv6-based automation network.

This complexity of these systems, interfaces, and configuration procedures, along with the cost of a trained installer has held home automation back from mass deployment. Some suppliers have attempted to simplify the commissioning process, but the resulting process has not been made simple enough. Other suppliers sell pre-configured systems, but the resulting systems are less useful and are difficult to expand.

SUMMARY

This specification discloses two different types of commissioning of devices for home automation systems: remote commissioning and assisted local commissioning. In remote commissioning, an automation device (e.g., a Z-wave controllable doorlock) is commissioned into (i.e., logically added to) the end-user's system before the end-user receives the automation device at home. The end-user is then able to install the pre-commissioned device into his/her home with relative ease compared to existing technology. In assisted local commissioning, the end-user uses an existing computing platform, such as a smart-phone, tablet, and/or laptop computer, to access information that provides step-by-step instructions to guide the end-user through the commissioning process for an automation device that is to be added to the home.

Remote commissioning uses information from many sources to determine how a system should be configured and then delivers the configuration to the devices with minimal interaction by the end-user or retailer. Information used for determining system configuration includes: knowledge of how the devices are likely to be used with the home, a list of existing devices in the home and how they are configured, possible input from the customer, and the end-user's current usage patterns. The method of delivering configurations can vary, but some methods can include updates to devices in the home via the Internet or via standards used for home automation in a combination of steps at the home and/or at the place distributing the devices.

Knowledge of how devices are likely to be used in a home, business, or neighborhood can be discovered by a number of methods, including querying configuration in the device or gathering RF network interconnection databases (e.g., stored in persistent storage such as EEPROMS in installed devices). The knowledge is useful in determining scenarios of how the system will likely be used. From such knowledge, for example, it may be determined that, if an end-user has or will have a select set of devices, then they will desire specific actions to take place associated with those devices. Alternatively or additionally, it may be determined from the subset of devices what additional devices an end-user may desire, for use as part of an up-sell strategy. All of these possible scenarios will result in settings for the commissioning of the system.

A list of devices and their configurations are part of the knowledge store of how devices are likely to be used in the home. This knowledge is used to decide both how the configurations of existing devices should be modified and how a new device should be commissioned into the existing ecosystem. In both cases, the communication paths have to be determined, including identifying bridging between devices using different communication standards, and commissioning may be adjusted appropriately.

Input from the customer can also be taken into account before commissioning or after the devices have already been installed on site. When ordering a new device, a customer may be asked select questions via a customer touch point (e.g., an app store, a web-site purchasing portal such as Amazon.com, or a link accessible from the purchasing portal to the commissioning server or via a sales representative) that determine how system setups should be done. After the devices are installed, a user may be prompted for answers to questions that affect setup because the installation has completed, or because the user selected to do so via a user interface. Certain usage patterns may also trigger a user to be prompted with questions whose answers may result in changes to the setup of the devices in their home.

Usage patterns as mentioned above could both be used to prompt the user with questions or result in automatic adjustments to the setting in the home that may not involve the user at all. By retaining device history, the system can determine usage patterns and preferred device settings that can result in adjustments to the system or device configurations. Examples of usage patterns that may trigger some automated or prompted commissioning include: recognizing select devices that are always used together, recognizing specific device settings that are usually done at certain times of the day, and specific device settings that are done based on current locations of the end-users.

A thermostat, for example, may have historically been adjusted in the morning and again at bedtime to save energy; yet this usage pattern would differ if the user were in a different location or a different season. Consider the different usage pattern experienced by a thermostat in Philadelphia, Pa. in the winter versus the same device in San Diego, Calif. in the summer. Now consider a scenario where the user has a connected device that determines home occupancy. This device may be in another RF network that never interacts with the thermostat. Tying the home occupancy sensor with thermostat control and automatically commissioning this relationship into a home controller may take place automatically or be provided as a recommended configuration to the user and then automatically scripted upon approval by the user.

Where and how commissioning takes place will vary greatly depending on all of the factors listed above. The resulting options can include: commissioning at a factory where the device is manufactured, at a warehouse where device is held for resale, in a retail store, or even at the home where the device is already physically installed (e.g., commissioning a doorlock that has just been installed by a carpenter so that it subsequently interoperates with other connected automation devices in the home). For in-home commissioning of a device that is already installed, it should be powered on and identified first. Tools can be used to either identify the device during the inclusion process or before the install even happens. Once the device is included into the existing ecosystem, a user provides feedback for specific usage scenarios that can be generated at that time or after usage patterns have been established. All of this can also be taken into account if a new device has to be commissioned before leaving the store or warehouse. If it is to be commissioned offsite, then information can be sent to configuration tools, Internet servers, or gateway devices located in the home. In this way, the device can identify itself when observing the local RF networks for which it was commissioned.

Separate components may work together to accomplish assisted local commissioning for home automation devices. The components used to accomplish this include: an end user's existing interface, a large database of devices, a hardware device, and a software application. The resulting experience is part of a unified process for installing home automation devices that provides pictures and explanations to a user along with real-time feedback and automatic setup whenever possible.

In today's market, an end-user who would be purchasing home automation devices is likely to have an existing generic computing platform with a user interface in the form of a smart-phone, tablet, laptop, or combination there-of that can be used for automation device commissioning. By using their existing interface, the end-user does not have to purchase an additional expensive device with a screen that is dedicated to commissioning. An end-user may likely prefer and appreciate an automation interface that was made to run on their smart phone or laptop because they are familiar with the usual ways such applications are organized and work on these devices.

The ability of the commissioning tool to commission a variety of different devices is supported by a device database. This database contains information needed for the behind-the-scenes technical commissioning and contains device photographs and text for various procedures that the end user may be interested in carrying out relative to his automation devices. The database is primarily stored in remote Internet servers (e.g., the "Cloud"), but sections may be locally cached as well in select cases for speed. Commissioning information that is stored in the database includes information to represent the device in a generic manner independent of the wireless or wired standard, along with information that is specific to the standard(s) the device uses. Photographs of the device and text are prepared especially for this use in order to keep the experience uniform across brands and connected device standards. Device-specific visuals as well as generic visuals or graphics may also be used.

A hardware platform may be used as a bridge between the user's smart-phone, tablet, or laptop and the device to be commissioned. For example, a hardware platform that includes a Z-Wave radio may be used to allow a smartphone application to communicate with a connected device that adheres to the Z-Wave standard. The hardware platform includes a host processor that is able to adapt to whatever interface is required to connect to the interface platform being used, and adapt to whatever wireless processor or physical interface is needed to communicate with a specific connected device standard. The physical interface to the hardware platform may include physical standards such as USB or Apple Dock, Apple Lightning®, or wireless standards such as Bluetooth. The home automation processor/interface may also vary or be designed to support multiple home automation standards of which there are many. Examples include Z-Wave, ZigBee, Ant+, and 6LoPan.

In some embodiments, the home automation processor/interface may include general purpose digital and analog radio hardware and may dynamically download (e.g., via the cloud) or load (e.g., from local EEPROM) the instructions to configure the general purpose hardware so that it may function to communicate with one or more of the home automation standards, in some cases, as a result of accessing the Cloud-based database and determining what devices it may want to communicate with in the home.

The user interface presented by the software application will vary based on the platform being used, but the underlining purpose will be the same in most cases. The user is assisted in setup of home automation devices by referencing the database and communicating with the device via the appropriate home automation standard. The device will also function to minimize assistance from the user.

Whenever possible, settings will be done to other devices in the local network or home automation network without having to interact with the end user.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1A:
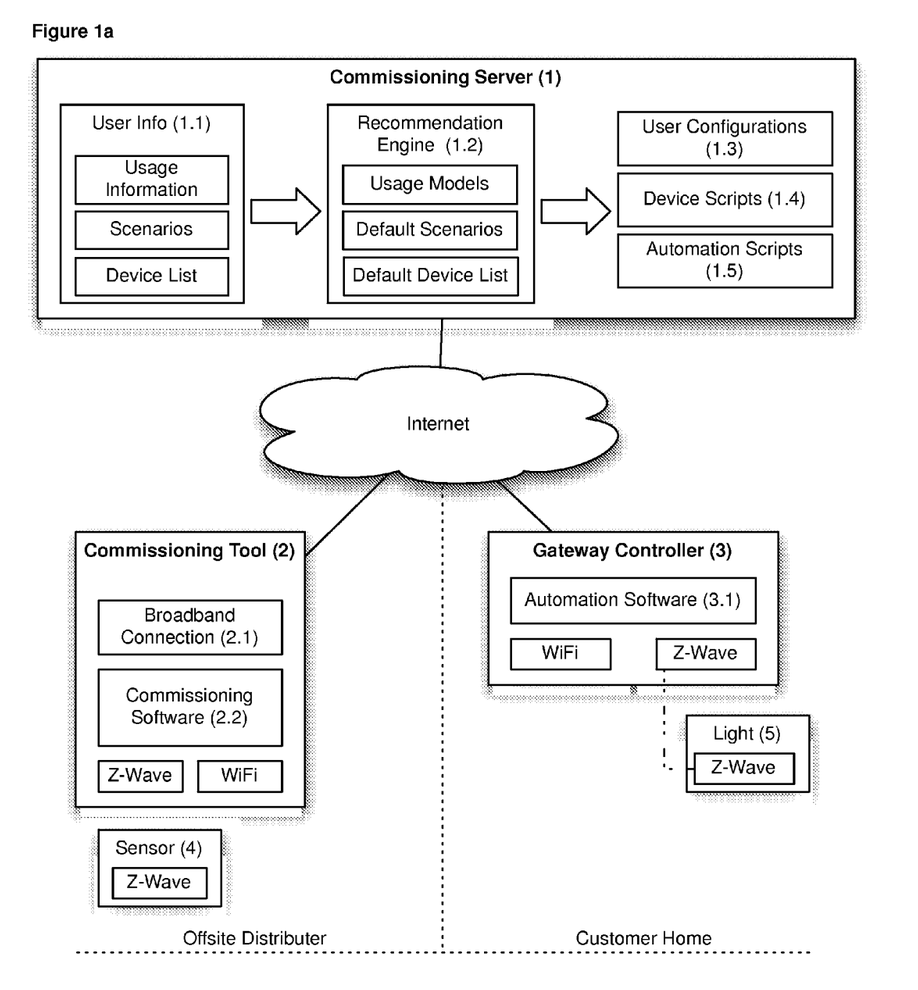
FIG. 1a and FIG. 1b show block diagrams representing the purchasing and commissioning of a Z-Wave Sensor to an existing Z-Wave Ecosystem.
Figure 1B:
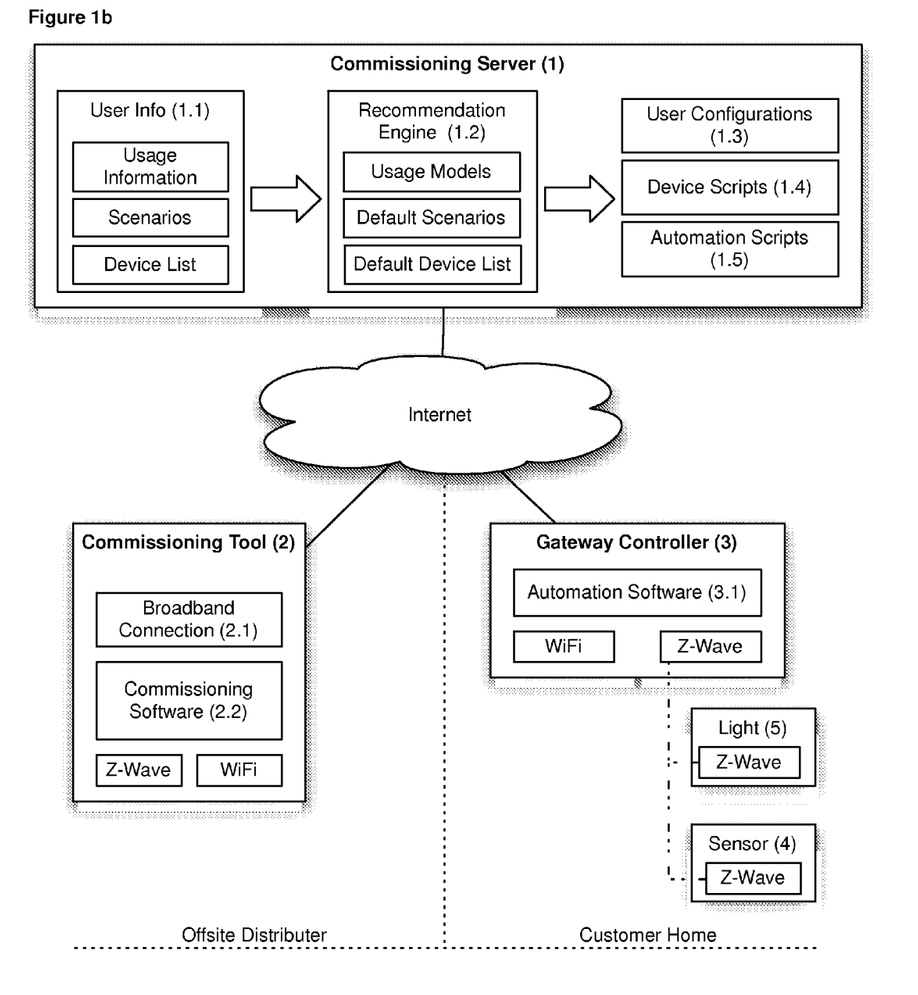

FIG. 1a and FIG. 1b are block diagrams representing, on the lower left, an Offsite Distributer and, on the lower right, a Customer Home. Gateway Controller (3) is connected to the Internet using WiFi and uses a wireless standard such as Z-Wave to communicate with and control Light (5). Gateway (3) contains Automation Software (3.1) to operate connected devices in the home. In FIG. 1a, there is an operating Z-Wave ecosystem that contains Light (5) in the customer's home.

FIG. 1a and FIG. 1b depict connectivity through the Internet to a Commissioning Server (1) for setup and control of connected devices. The Commissioning Server (1) offers a scenario to the homeowner where a new sensor (4) will enable light (5) to turn on and off when occupancy is detected in the home. The Commissioning Server (1) selected the aforementioned scenario to present to the user by using the User Info (1.1) about what devices are installed in the Customer House, usage of those devices, and a list of possible scenarios. The homeowner accepts this offer and places an order for this sensor and scenario.

When the purchase occurs, the Commissioning Server (1) identifies the purchaser and queues the order to be fulfilled by an offsite distributer. The distributer pulls the particular product, a sensor (4) in this case, from stock. The distributer uses the Commissioning Tool (2) to fulfill the order. The tool accomplishes this by using Commissioning Software (2.2) with information provided by the Recommendation Engine (1.2). First, information about the Z-Wave network on Gateway Controller (3) is backed up to Commissioning Server (1) and is sent to Commissioning Tool (2). This information is used to perform the first step, to logically add the sensor (4) into the Z-Wave network of the Customer Home. The next step is to send any device-specific configurations defined in the Device Scripts (1.4) to the sensor while it is still at the distributer. Once complete, Commissioning Tool (2) sends back the updated Z-Wave network information to the Commissioning Server (1). The Gateway Controller (3) receives the updated Z-Wave network information, along with the User Configurations (1.3) and Automation Scripts (1.5) from Commissioning Server (1). This information is used to configure device names and room location as well as how the system will handle information that the sensor reports in the home.

FIG. 1b shows the sensor installed into the home following the distributer commissioning process. It is now part of the Z-Wave network (5) of the house, having been installed and powered up without the requirement for any additional operations at the Customer Home. When occupancy information is sent from the sensor, the light in the home operates as requested by the user defined by the scenario.

Figure 2A:
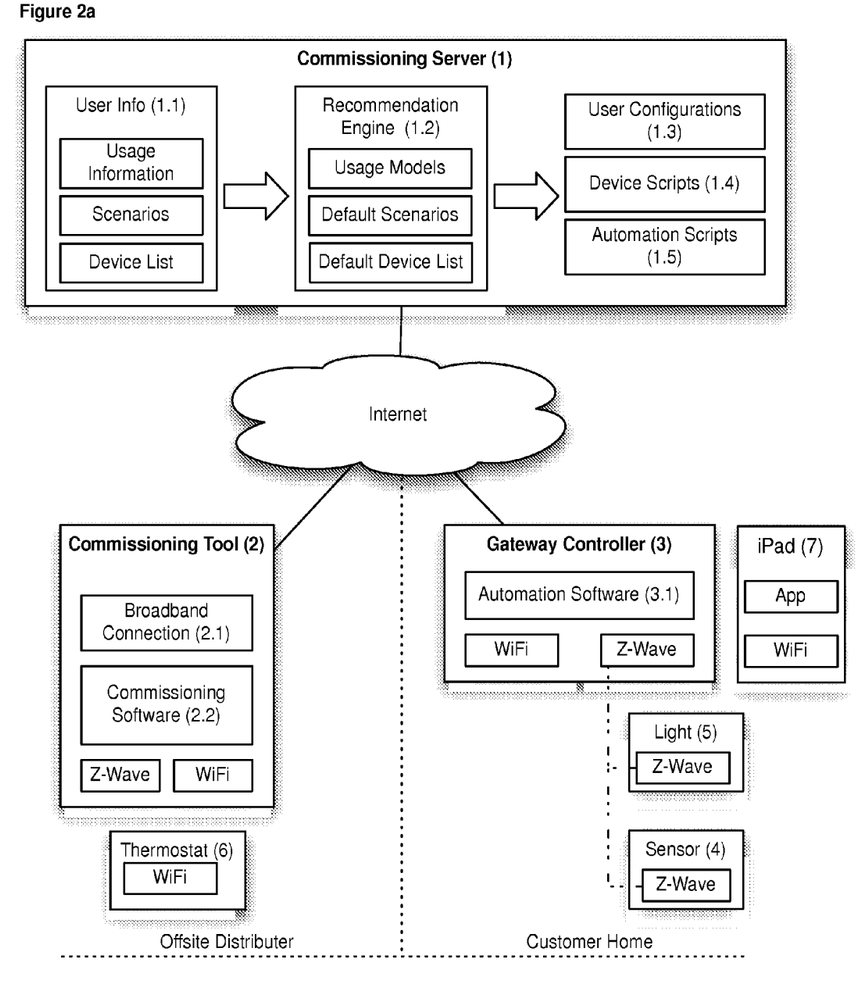
FIG. 2a and FIG. 2b show block diagrams representing the purchasing and commissioning of a thermostat to add to a pre-existing installation.

FIG. 2a is a block diagram representing the purchasing and commissioning of a Thermostat (6) to add to the pre-existing installation represented by FIG. 1b. The purchase on Commissioning Server (1) is made through a customer portal on iPad (7) in this example. The purchase is identified as being made by an existing user after referencing the User Info (1.1). The new Thermostat (6) is added to the User's Device List (1.1). The Recommendation Engine (1.2) generates new usage scenarios based on Usage Models (1.2), Default Device List (1.2), and, because the user is a pre-existing user, User Usage Information (1.1). Recommendation Engine (1.2) gives the customer choices of how they want the thermostat to operate in the home. For example, one recommended scenario presented to the user is that, every time the in-home sensor determines that the home is unoccupied, the thermostat would be controlled into an "energy-saving" mode.

With this new usage scenario, user Configuration (1.3) and Automation Scripts (1.5) are generated and sent to Gateway Controller (3). A purchase request is sent to the Offsite Distributer for a new WiFi thermostat (6). The Commissioning Tool (2) is used to setup the Thermostat (6) such that it will be able to talk to the WiFi in the home (e.g., if the home uses WPA security on its home WiFi network, then the WiFi WPA password is configured into the WiFi parameter settings of the Thermostat in advance of it being installed in the home). When this is complete, Thermostat (6) is sent to the home and installed. To see and control Thermostat (6) via WiFi, a new Thermostat Control Menu is now made available on iPad (7). When the iPad App starts, it will ask the Gateway Controller (3) what devices are in the home and what their capabilities are. That menu and the information about the new Thermostat (6) are sent from Gateway Controller (3), which was made aware that there is a new Thermostat (6) by Commissioning Server (1). Gateway Controller (3) may now communicate to the newly installed Thermostat (6) using Internet Protocol (IP) via the house WiFi.

Figure 2B:
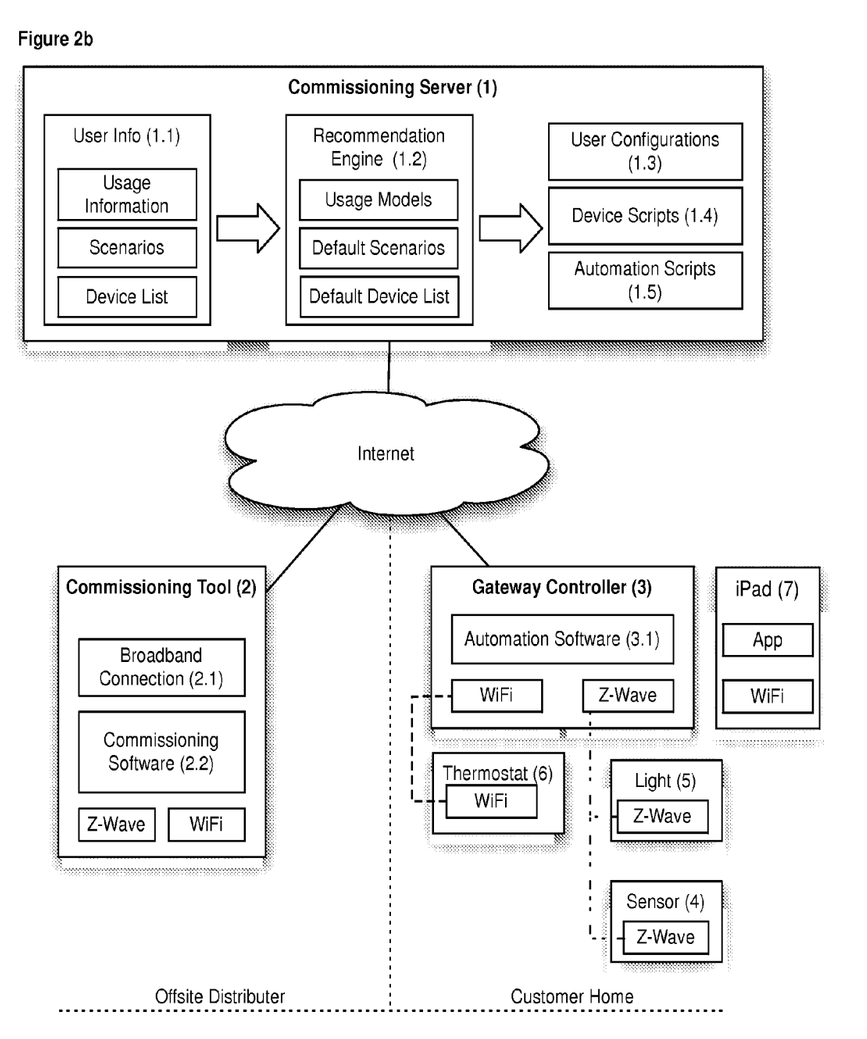
Figure 3A:
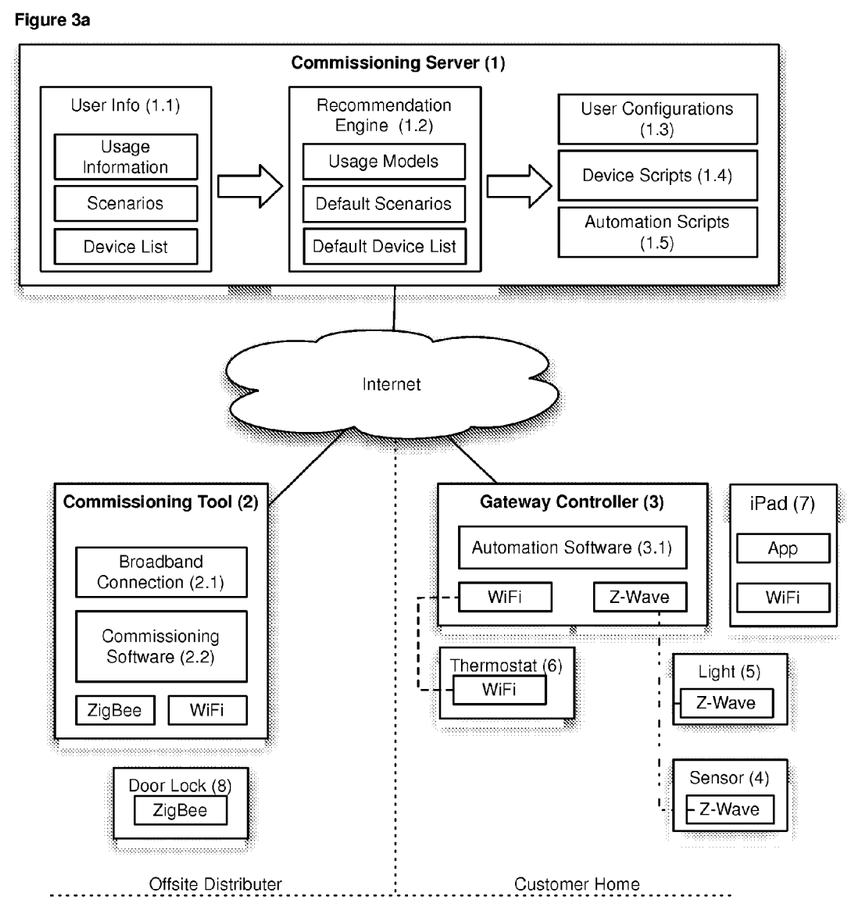
FIG. 3a and FIG. 3b show block diagrams representing the purchasing and commissioning of a door lock to add to a pre-existing installation.

FIG. 3a is a block diagram representing the purchasing and commissioning of Door Lock (8) to add to the pre-existing installation represented by FIG. 2b. The purchase is performed this time by a webpage portal via a browser such as the Apple Safari browser running on iPad (7). When the purchase is made, it is determined that the user is an existing user after referencing the User Info (1.1). New Door Lock (8) is added to the User's Device List (1.1), and the Recommendation Engine (1.2) is kicked off. The engine generates new scenarios based on Usage Models (1.2), Default Device List (1.2), and, because the user is a pre-existing user, there is User Usage Information (1.1). With these new scenarios generated, the Recommendation Engine (1.2) will present to the homeowner the option for the Door Lock (8) to put the Thermostat (6) into a "comfort" mode whenever the door is unlocked.

Figure 3B:
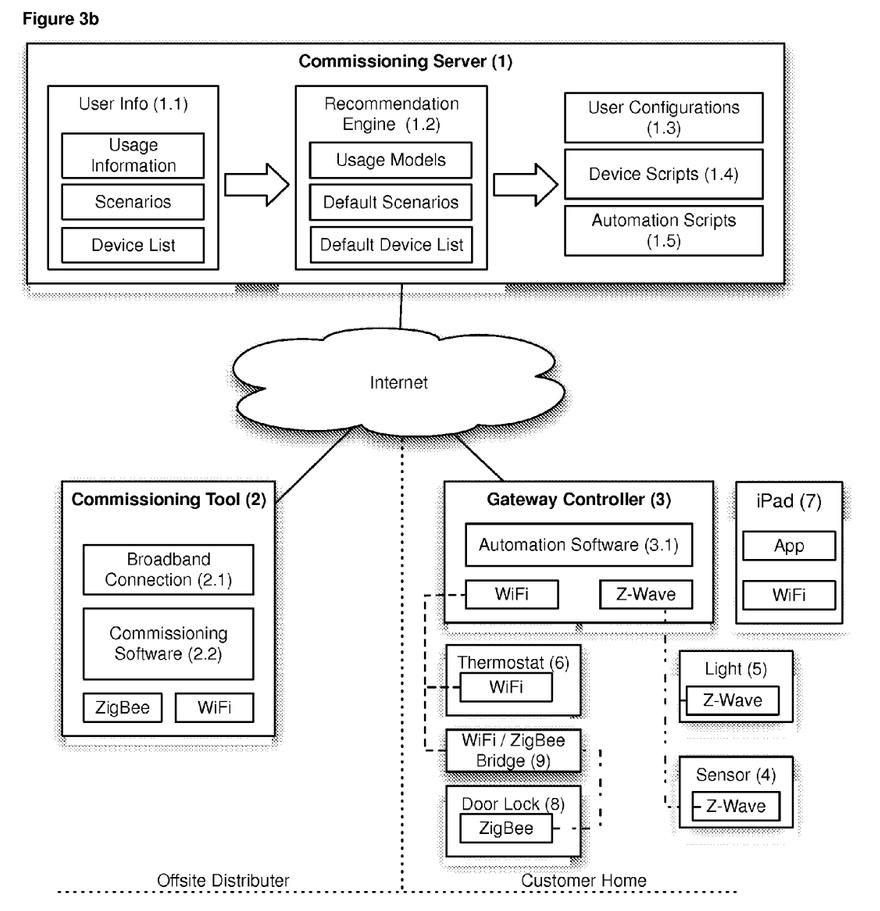

FIG. 3b shows the Door Lock (8) already commissioned by the Commissioning Tool (2). This time the tool contained a ZigBee radio since this Door Lock (8) has a ZigBee radio interface. In this example, this process is made more complex because the new Door Lock (8) is using a different RF standard than the standard used by the other automation devices currently in the home, which standard in this example is Z-Wave. Thermostat (6) is using WiFi, the Light and Sensor are using Z-Wave, and Door Lock (8) is using the Zigbee wireless standard. Because the Gateway Controller (3) does not support ZigBee natively, a WiFi-to-ZigBee bridge (9) was bundled with the Door Lock at Commissioning. This bridge (9) enables Gateway Controller (3) to talk to Door Lock (8). Now when ZigBee Door Lock (8) is un-locked, WiFi Thermostat (6) is put into a "comfort" mode via the Gateway Controller. At the same time when Sensor (4) sees that that home is occupied, the Lights (5) turn on.

Figure 4:
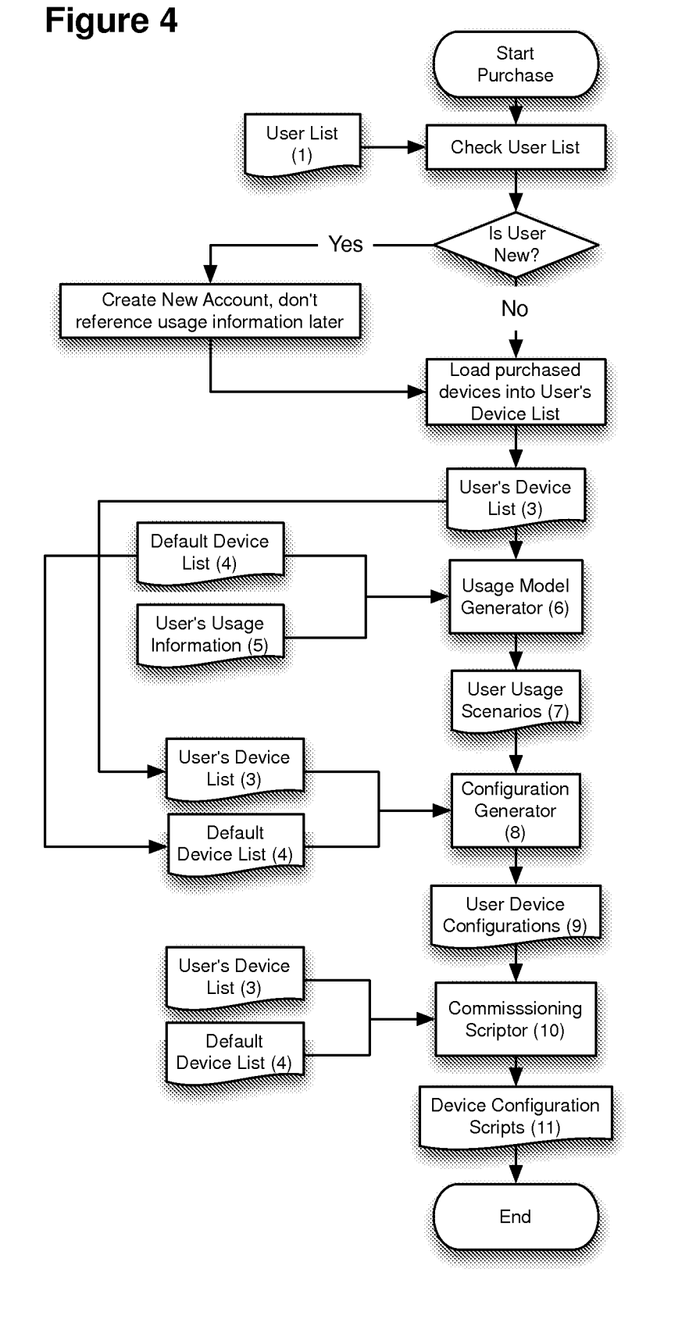
FIG. 4 shows a flow diagram representing a process for producing device configuration scripts.

FIG. 4 is a flow diagram of the process of generating Device Configuration Scripts (11). The first step is to check the User List (1) and identify if the user is a new user. If so, then a new account is created. Next, purchased devices are loaded into the User's Device List (3). After that, Usage Model Generator (6) uses inputs from the User's Device List (3), Default Device List (4), and User's Usage Information (5) to create User Usage Scenarios (7). The Configuration Generator (8) creates User Device Configurations (9) by referencing the User Usage Scenarios (7), the User's Device List (3), and the Default Device List (4). Finally, the Commissioning Scripter (10) creates Device Configuration Scripts (11) referencing the User Device Configurations (9), the User's Device List (3), and the Default Device List (4).

Figure 5:
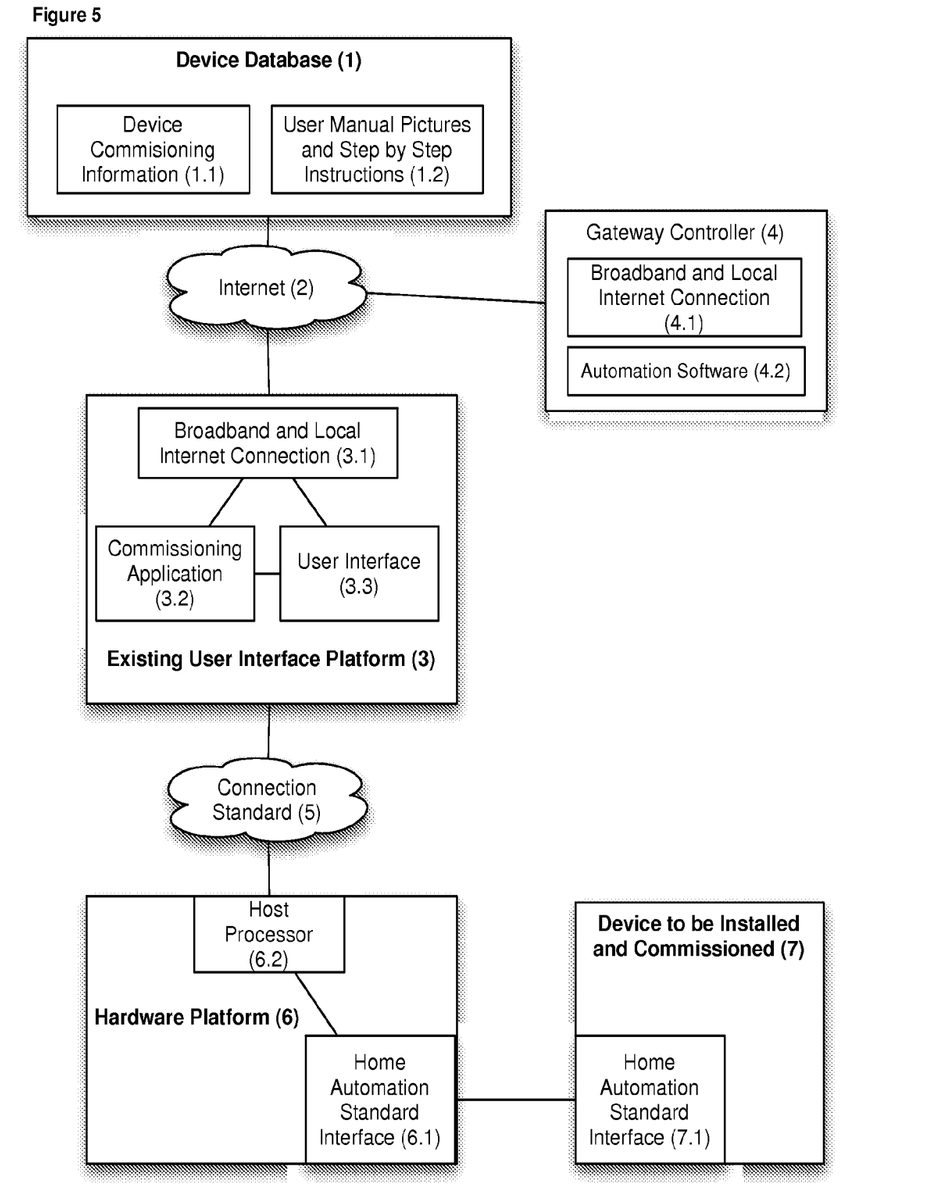
FIG. 5 shows a block diagram of major components in the system and their components and interfaces.

FIG. 5 is a block diagram of major components in the system and their sub-systems and interfaces with the major components being a Default Device Database (1), an Existing User Interface Platform (3), a Hardware Platform (6), and a Device to be Installed and Commissioned (7). The end user will interact with the User Interface (3.3) located on the Existing User Interface Platform (3), which functions as a commissioning tool. The Existing User Interface Platform (3) could be a smart-phone, tablet, or laptop. It is connected to the Internet (2) by its Broadband Internet Connection (3.1) via a wired standard such as Ethernet or a wireless standard such as WiFi, 4G, or GPRS. The Default Device Database (1) is also connected to the Internet (2). From time to time, the User Interface (3.3) will fetch User Manual Pictures and Step-by-Step Instructions (1.2) from the Default Device Database (1) via the Internet (2). From time to time, the Commissioning Application (3.2) will fetch Device Commissioning Information (1.1) located on the Default Device Database (1) via the Internet (2). The Commissioning Application (3.2) is controlled via the User Interface (3.3). When the Commissioning Application (3.2) is instructed by the User Interface (3.3) to interface with the Device to be Installed and Commissioned (7) it does so through the Hardware Platform (6). The Existing User Interface Platform (3) is connected to the Hardware Platform (6) via some Connection Standard (5) that can include a wired connection such as USB or Apple Dock or it could connect via a wireless standard such as LP Bluetooth or NFC or it may be a part or configuration option of Existing User Interface Platform (3). The Host Processor (6.2) on the Hardware Platform (6) will handle communicating with the Existing User Interface Platform (3) via the Connection Standard (5). The Host Processor (6.2) will connect to the Device to be Installed and Commissioned (7) via the Home Automation Standard Interface (6.1) and (7.1). It is through all of these connections that the Commissioning Application (3.2) is able to properly commission the Device to be Installed and Commissioned (7). During this entire process, the Gateway Controller's automation Software (4.2) is notified of the process through the Local or Broadband Internet (2). Metadata, such as names and locations, may be sent to the Gateway Controller (4) via the Commissioning Application (3.2).

Figure 6:
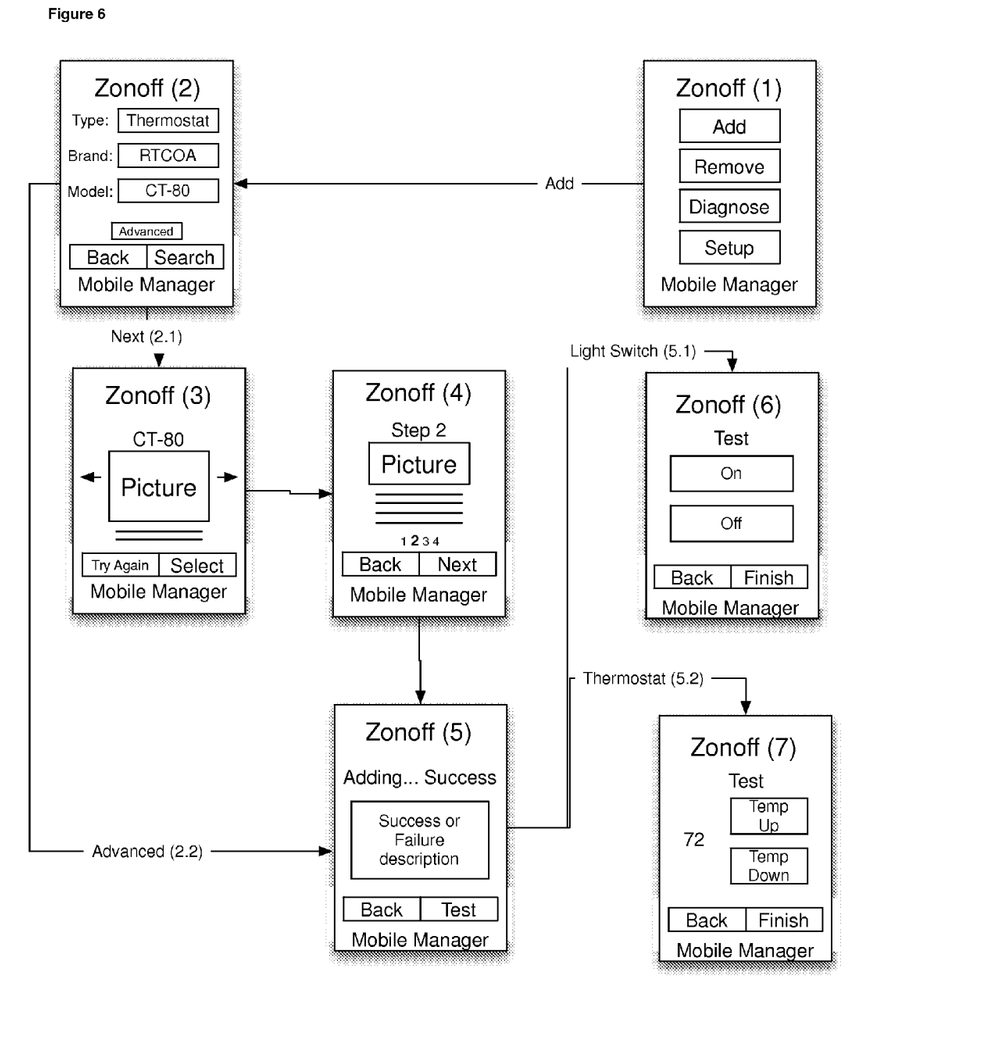
FIG. 6 shows a diagram representing application interface flow for commissioning a new device.

FIG. 6 is a diagram representing an example application interface flow for commissioning a new device. The user interface example shown is for a smart-phone such as an Apple iPhone or Google Android operating system based smartphone such as the Motorola Droid X, with a relatively limited screen size. Each step is represented by a screen shot with the company/application name "Zonoff" at the top and the generic name for the application "Mobile Manager" at the bottom. In cases where this software is supplied to a third party, for example, a third party with the name of Home Automation Controllers, Inc. (HAC, Inc.), "Zonoff" may be replaced by a title such as "HAC, Inc.," or a brand name such as "EZ-Kamish." The flow starts with top menu screen (1) where the user can choose to "add" a new device. Upon selecting "Add," the device displays the next screen, which supports the second step of commissioning (2). This step allows the user to select "Advanced" (2.2) to bypass an assisted installation or select "Search" (2.1) to enter search criteria to find the device the user is about to install. In some cases, the Mobile Manager application may attempt to identify the device automatically via a handshaking identification routine it performs with the device. During such automation identification, the hardware interface to the automation device (e.g., Hardware Platform (6) of FIG. 5) may attempt to communicate with the device using different hardware and software protocols it supports. These protocols may be built into the hardware platform or downloaded from the Internet or other sources, potentially from the automation device itself using a simple baseline protocol that both devices understand. In either case, selections of this menu (2) are fetched from the default device database described in FIG. 5. After the user selects the search criteria in step (2), in step (3) the screen displays the results in picture and short description form, which information is also fetched from the database mentioned with respect to FIG. 5. The user is able to use screen (3) to scroll until the correct device is found. After the user selects the device from search results (3), the user is able to start the installation process with picture and text descriptions (4) all fetched from the database mentioned in FIG. 5. The number of steps for installation process (4) will vary depending on the complexity of the installation. Examples of what will be provided in the installation process (4) include wiring diagrams, mounting instructions, and menu setup. Ultimately, the mobile manager may provide a description on how to include the device in the network. With the user now having been instructed on how to include the device into a network, screen (5) walks a user through adding the device to a network.

To start the actual device inclusion process (adding the device to the network), the hardware platform mentioned in FIGS. 5-6 that communicates to the device being included, is now used. A network connection to talk to databases and local controllers in the network to complete the process is also made use of. The user will be given real-time feedback as to how the process is going (5), eventually receiving confirmation of a success or failure, not only from the Home Automation Standard Interface in FIGS. 5-6 but also from the Gateway Controller that the application is talking to over the local network in FIGS. 5-6.

In the case of a success or a failure, instructions will be given on how to correct the situation or continue, respectively. In the case of a success, the user will be lead to testing steps (5.1) or (5.2), depending on the type of device that was added and what testing operations are available. Depending on what device is included into the network, different methods of testing may be used. Diagrammed in FIG. 6 are possible testing screens for a light switch (6) and for a thermostat (7).

Figure 7:
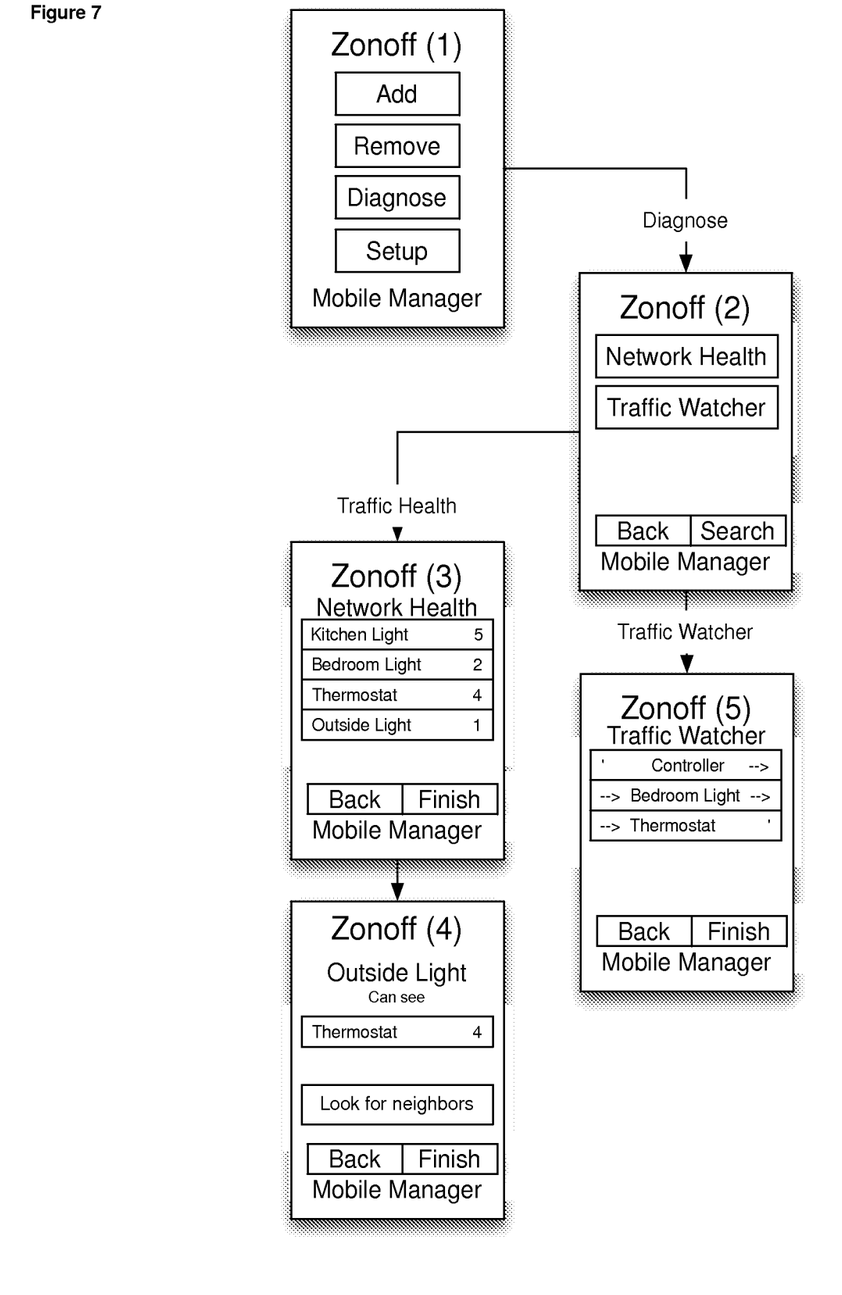
FIG. 7 shows a diagram representing some possible screens and flows for diagnosing installation problems.

FIG. 7 is a diagram representing some example screens and flows for diagnosing installation problems. The first screen (1) allows the user to select "diagnose" from the menu, taking the user to a sub-menu (2) for the type of diagnosis. The first selection on the sub-menu (2) is network health. By pressing this button, the user is taken to the network health screen (3), which rates how well different devices in the home automation network are connected. This allows an installer to identify weak network paths (e.g., marginal signal strength and intermittent wireless connections), which are very hard to identify with wireless installations. This screen (3) allows the user to identify weak paths of the network and drill down (4) to what connection a specific device has to a network along with possible tools or suggestions on how to improve this device's network health. The other option on the diagnosis sub-menu (2) is a traffic watcher. This screen (5) allows a user to watch the messages travel across a network. This screen (5) is not designed specifically for developers, but also particularly for end-users to see what paths messages are taking and what types of messages are or are not being sent within a system.

At least one embodiment is a method for commissioning a new device for an end-user's automation system, wherein (a) a commissioning tool is used to access information about the end-user's automation system stored in a centralized database remote from the end-user's automation system, (b) the commissioning tool is used to instruct a commissioning server to commission the new device for the end-user's automation system, wherein the commissioning server is remotely located from the end-user's automation system, and (c) the commissioned new device is installed into the end-user's automation system.

In at least one embodiment, the commissioning tool is used remotely from the end-user's automation system to perform steps (a) and (b) prior to the new device arriving at the end-user's automation system location such that the new device is already pre-commissioned upon arrival at the end-user's automation system location.

In at least one embodiment, the commissioning tool is used locally at the end-user's automation system location to perform steps (a) and (b) after the new device has arrived at the end-user's automation system location.

In at least one embodiment, the commissioning tool is a consumer device of the end-user.

In at least one embodiment, the commissioning tool is a smart-phone, tablet, or laptop computer of the end-user.

In at least one embodiment, step (c) comprises using the commissioning tool to access step-by-step instructions from the commissioning server for installing the new device into the end-user's automation system.

At least one embodiment is a commissioning tool for commissioning an automation device for use with a user's automation system, the commissioning tool comprising an automation-device interface for communicating with the automation device and an interface for communicating with an application. The commissioning tool is configured to allow the application to retrieve information from the automation device via the automation-device interface, set parameters within the automation device, communicate to a cloud-based database of automation-device information, and present the user with a graphical menu of options for commissioning the automation device via the setting of parameters within the automation device. The options presented on the graphical menu are a function of information retrieved from the cloud-based database.

In at least one embodiment, the graphical menu includes a visual representation of the automation device.

In at least one embodiment, the cloud-based database contains user statistics for the automation device and the options presented on the graphical menu are a function of the user statistics for the device.

In at least one embodiment, the automation-device interface is a Z-Wave radio.

In at least one embodiment, the automation-device interface is part of a smart phone.

In at least one embodiment, the automation-device interface is an IEEE 802.11x compliant radio, where the "x" implies any one or more of the IEEE 802.11 family of standards.

In at least one embodiment, the automation-device interface includes general purpose hardware that is configurable to provide support for one or more automation-device interface standards.

In at least one embodiment, the automation-device interface is configured to support two or more automation-device communication standards concurrently.

In at least one embodiment, a communication standard supported by the automation-device interface is configured as a function of information retrieved from the cloud-based database of automation-device information.

At least one embodiment is method for commissioning a new automation device in an automation system for a user, the method comprising (a) loading a newly purchased device into a user's device list in a memory; (b) retrieving data from the memory comprising the user's device list and the user's usage information; (c) generating user-usage scenarios involving at least the newly purchased device and an other device in the user's device list as a function of the retrieved data; (d) generating device configuration scripts as a function of the user-usage scenarios; and (e) loading the configuration scripts into at least the newly purchased device and the other device in the user's device list.

In at least one embodiment, generating the device configuration scripts comprises prompting the user for selection of one of at least two different user-usage scenarios and accepting a selection of one of the user-usage scenarios from the user.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

While embodiments of this invention are written in the context of home automation, it should be understood that the invention applies as well to business, factory, or regional or campus automation. For example, smart automation devices such as demand response units (DRUs) installed by service personnel across a region at businesses and residences in support of energy demand management for a utility would be understood to fall within the scope and intent of this application. DRUs and their application are described in this document http://www.sciremc.com/efficiencyResources/demandResponseUnit.aspx, incorporated herein by reference in its entirety.

What is claimed is:

1. A method for pre-commissioning a new device for an end-user's automation system, the method comprising:
   (a) receiving a request to pre-commission the new device for the end-user's automation system;
   (b) generating a personalized device setup for the new device based on usage patterns corresponding to past usage of one or more existing devices in the end-user's automation system;
   (c) pre-commissioning the new device via a wireless link based on the personalized device setup while the new device is remote from the end-user's automation system, such that, when the pre-commissioned new device is powered on within the end-user's automation system, the pre-commissioned new device operates within the end-user's automation system without the need for any further configuration by the end user and without the need for any local commissioning by the end-user's automation system; and (d) logically adding the new device into the end-user's automation system in order to pre-commission the new device while the new device is remote from the end-user's automation system.

2. The method of claim 1, wherein:

the end-user's automation system comprises a gateway controller that does not support a direct wireless link with the pre-commissioned new device, such that the pre-commissioned new device requires a bridge device in order to communicate with the gateway controller; and further comprising logically including the bridge device in the end-user's automation system.

3. The method of claim 1, wherein:

the end-user's automation system comprises a gateway controller that does not support a direct wireless link with the pre-commissioned new device, such that the pre-commissioned new device requires a new bridge device in order to communicate with the gateway controller; and step (c) further comprises pre-commissioning the new bridge device while the new bridge device is remote from the end-user's automation system, such that, when the pre-commissioned new device and the pre-commissioned new bridge device are powered on within the end-user's automation system, the pre-commissioned new device and the pre-commissioned new bridge device operate within the end-user's automation system without the need for any further configuration by the end user and without the need for any local commissioning by the end-user's automation system.

4. The method of claim 1, wherein:

the end-user's automation system comprises a gateway controller that communicates with the one or more existing devices in the end-user's automation system; and further comprising receiving information corresponding to the usage patterns from the gateway controller.

5. The method of claim 4, further comprising transmitting information corresponding to the pre-commissioned new device to the gateway controller, such that the end-user's automation system knows about the pre-commissioned new device before the pre-commissioned new device is powered on within the end-user's automation system.

6. The method of claim 1, wherein:

a first existing device in the end-user's automation system is a different type of device from the new device; and further comprising generating the personalized device setup for the new device based on usage patterns corresponding to past usage of the first existing device in the end-user's automation system.

7. A computer for pre-commissioning a new device for an end-user's automation system, wherein computer is remote from the end-user's automation system and:

(a) the computer receives a request to pre-commission the new device for the end-user's automation system;

(b) the computer generates a personalized device setup for the new device based on usage patterns corresponding to past usage of one or more existing devices in the end-user's automation system, wherein the computer pre-commissions the new device via a wireless link based on the personalized device setup while the new device is remote from the end-user's automation system, such that, when the pre-commissioned new device is powered on within the end-user's automation system, the pre-commissioned new device operates within the end-user's automation system without the need for any further configuration by the end user and without the need for any local commissioning by the end-user's automation system; and (c) the computer logically adds the new device into the end-user's automation system in order to pre-commission the new device while the new device is remote from the end-user's automation system.

8. The computer of claim 7, wherein:

the end-user's automation system comprises a gateway controller that does not support a direct wireless link with the pre-commissioned new device, such that the pre-commissioned new device requires a bridge device in order to communicate with the gateway controller; and the computer logically includes the bridge device in the end-user's automation system.

9. The computer of claim 7, wherein:

the end-user's automation system comprises a gateway controller that does not support a direct wireless link with the pre-commissioned new device, such that the pre-commissioned new device requires a new bridge device in order to communicate with the gateway controller; and the computer pre-commissions the new bridge device while the new bridge device is remote from the end-user's automation system, such that, when the pre-commissioned new device and the pre-commissioned new bridge device are powered on within the end-user's automation system, the pre-commissioned new device and the pre-commissioned new bridge device operate within the end-user's automation system without the need for any further configuration by the end user and without the need for any local commissioning by the end-user's automation system.

10. The computer of claim 7, wherein:

the end-user's automation system comprises a gateway controller that communicates with the one or more existing devices in the end-user's automation system; and the computer receives information corresponding to the usage patterns from the gateway controller.

11. The computer of claim 10, wherein the computer transmits information corresponding to the pre-commissioned new device to the gateway controller, such that the end-user's automation system knows about the pre-commissioned new device before the pre-commissioned new device is powered on within the end-user's automation system.

12. The computer of claim 7, wherein:

a first existing device in the end-user's automation system is a different type of device from the new device; and the computer generates the personalized device setup for the new device based on usage patterns corresponding to past usage of the first existing device in the end-user's automation system.

* * * * *